Oct. 29, 1968   C. W. BERGHOUT ET AL   3,408,235
METHOD OF MANUFACTURING WOUND $Nb_3Sn$-CONTAINING BODIES
Filed March 15, 1965
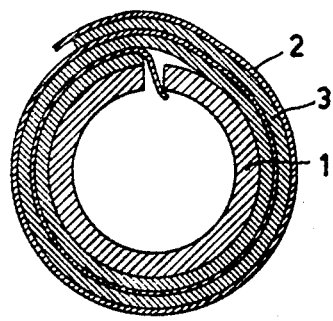
INVENTORS
CORNELIS W. BERGHOUT
SONJA WOLFF
BY
AGENT United States Patent Office 3,408,235
Patented Oct. 29, 1968

3,408,235
METHOD OF MANUFACTURING WOUND $Nb_3Sn$-CONTAINING BODIES
Cornelis Willem Berghout, Emmasingel, Eindhoven, and Sonja Wolff, Krimpen aan den Ijssel, Netherlands, assignors to North American Philips Company, Inc., New York, N.Y., a corporation of Delaware
Filed Mar. 15, 1965, Ser. No. 439,681
Claims priority, application Netherlands, Mar. 17, 1964, 6402795
2 Claims. (Cl. 148—6.3)

ABSTRACT OF THE DISCLOSURE

Wound $Nb_3Sn$ body having an insulating winding of a surface niobium oxidized foil.

The invention relates to a method of manufacturing a wound $Nb_3Sn$-containing body and to the wound body thus manufactured.

The compound $Nb_3Sn$ is a known so-called "hard" superconductor, that is to say a compound which has an infinitely small resistance up to very high magnetic field strengths at temperatures below 18° K. Wound bodies manufactured from $Nb_3Sn$ present the possibility of producing and maintaining these high field strengths (up to 200 kilo-oersted) with a comparatively small consumption of energy.

A drawback of the $Nb_3Sn$ is that it is extremely brittle as a result of which it is impossible without a trick to manufacture coils of wound $Nb_3Sn$-wire.

Such a trick is embodied in the known method according to which a tube of niobium metal with a mixture of powdered niobium and tin with a total quantity of tin of 15–30% is reduced to wire of the desired diameter, the said wire then being wound to form a coil and finally being subjected to a thermal treatment at a temperature between 920 and 1200° C. During this thermal treatment, which consequently is carried only after the required shaping has taken place, the compound $Nb_3Sn$ is formed. The limits in temperature and duration between which the thermal treatment must take place are critical in connection with the structure required for obtaining optimum superconducting properties. According to another trick, which is described in applicants' patent application which is not yet laid open to public inspection, first a body is manufactured from a so-called impregnating alloy in which each of the components Nb and Sn is present but which has not yet been treated thermally to form the compound $Nb_3Sn$. A body which consists of such an impregnating alloy may be machined with cutting tools in all kinds of manners such as milling, sawing or turning. The impregnating alloy is obtained by compressing niobium powder or rolling niobium foil, it being ensured that the pore volume after compression, or after subsequent sintering, or the space between the foils is from 20 to 45%, and the body thus obtained is kept in contact with molten tin for such a period of time at a temperature between 600 and 1200° C. that the pores or the space between the foils are/or is filled with tin. In this manner a coil may be manufactured by winding one or more niobium foils with foils of insulating material, then dipping this wound cylindrical body in liquid tin, then cutting the thus obtained body into a number of wafers, stacking the alternately turned wafers with interposed insulation and connecting them so that they are connected in series.

Finally a method is stated according to which niobium wire or a number of these wires which are combined to form a bundle are provided with an insulating layer, are wound to a coil and are heated also only in this stage to form the compound $Nb_3Sn$.

A great difficulty in the manufacture of these wound bodies is the provision of a suitable insulation. This insulation must be capable of withstanding the temperature at which the thermal treatment takes place and must also at this temperature withstand the action of tin and $Nb_3Sn$. It has been proposed to use as an insulation a fabric of quartz fibre which is not an elegant solution to the problem. For the constructions in which the tin is in direct contact with the insulation, this solution is in addition useless because the tin penetrates between the quartz fibres and forms a very low-ohmic short-circuit.

Metallic insulation materials also cannot be used as such for large coils. The low shunt resistance which the coils then obtain combined with the great inductance results in too large charge times.

The invention provides a method of manufacturing a wound $Nb_3Sn$-containing body with whole or partial interposition of an insulation material between the windings with which a simple solution to the problem of the insulation material is given.

According to the invention, the insulation material is obtained by thermal oxidation of niobium foil having a thickness of at most 60 microns consisting of a heating in an oxidizing atmosphere at a temperature between 625 and 850° C.

In contrast with oxide films in which no particular measures during the formation are taken, the oxide films thus obtained were found to be mechanically very strong. Also the thicker oxide films of approximately $30\mu$ were found to adhere readily to the metal so that the foils can readily be handled and are elastically deformable. According to the invention exactly the oxide layers thus manufactured impose particular properties on $Nb_3Sn$ magnet coils. These oxide layers remain chemically unattacked both when in contact with tin during the thermal treatment of the coils and with niobium or with the forming $Nb_3Sn$. Mechanically also they are not attacked in spite of the fact that they show already submicroscopic cracks after their formation.

The formation of the oxide layers used in accordance with the invention must not take place below 625° C. and not above 850° C. since otherwise the oxide layers show too many cracks and easily detach from the underlying metal. The thickness of the oxide film is of minor importance. Preferably, however, thin foils will be used not only with a view to the requirements of use with respect to the space factor and the flexibility, but also because with foils having thicknesses above approximately 60 microns already traces of chipping oxide are noticed.

In case of wires it appears that the situation is much more unfavourable. The stresses in curved oxide layers are at right angles to the surface, as a result of which chipping of the oxide films is hardly avoidable. Only very thin curved oxide films, that is to say thinner than $5\mu$, sometimes are faultless.

In the oxidation of foils it should be ensured that the foils are flat. In places where scratches or folds occur the oxide layer more easily works loose than in flat places.

In order that the invention may readily be carried into effect it will be described in greater detail with reference to the ensuing specific examples.

EXAMPLES

1. Niobium foil, $23\mu$ thick, 25 mm. wide, was heated in air of 1 atmosphere at 625° C. for 4 minutes. The foil was heated to this temperature within 30 seconds. This thermal treatment resulted in an oxide layer of 5 microns thick on both sides of the foil.

Two tapes of Nb foil, 25 mm. wide and $23\mu$ thick, together with a tape of the oxidized Nb foil, were wound on an $Nb_3Sn$ cylinder having an inside diameter of 9 mm., an outside diameter of 11 mm. and a length of 25 mm. In the longitudinal direction the cylinder has a gap. The insulation foil begins at the gap in order to prevent that afterwards a short-circuited $Nb_3Sn$ circuit is formed. The number of turns was 20. On the outside the coil was surrounded by an $Nb_3Sn$ ring with an inside diameter of 16 mm., an outside diameter of 20 mm., a length of 25 mm. and which was also provided with a gap in the longitudinal direction. The insulation ends at the gap. The body thus obtained was kept immersed in a bath of molten tin of a temperature of 930° C. for two hours. After cooling, wafers of 1 mm. thick were cut out of the resulting coil. After such a wafer had been provided with current contacts, it was placed in liquid helium. Right after setting up a current of 100 a. a magnetic field of 1500 oersteds was formed in the centre of the spiral.

In the figure of the accompanying drawing a cross-section is shown of the coil obtained. In the drawing the tubular $Nb_3Sn$ core 1 is shown and a few of the spiral windings which consist of a spiral 2 of oxidized niobium foil and wound spiral 3 of $Nb_3Sn$.

2. Eight of the wafers thus obtained according to Example 1 were combined to form a coil. For this purpose the wafers were stacked on each other, every other wafer being turned, and connected so that as far as the current is concerned they are connected in series and the magnetic fields of the wafers are orientated equally.

The resulting coil was provided in a cryostat with liquid helium and energized with a current of 80 a. In this case also a magnetic field of 7500 oersteds was reached without measurable delay immediately after setting up the current.

3. Niobium wire having a diameter of 0.15 mm. was provided with a tin film by dipping in a bath of molten tin heated at 950° C. Two of these tin-plated wires were united to form a tape by passing them together through a bath of molten tin which was heated at 250° C. Of this tape a small coil was wound, the layers of windings being separated from each other by Nb-foil oxidized according to Example 1. The windings in a layer were isolated from each other only by winding with some intermediate space. The length of the coil was 12 mm., the inside diameter 6 mm. and the outside diameter 10 mm. The coil consisted of 9 layers with each 12 turns. In order to form the compound $Nb_3Sn$ along the surface of the wires, the coil was heated in vacuo for two hours at 930° C. Then the coil was pickled with hydrochloric acid to remove a thin tin film which covered the whole coil. The coil was placed in a cryostat with liquid helium and, as in the preceding examples, it was found in this case also that the magnetic field of 5700 oersteds is formed in the coil without any delay when a current of 70 a. was set up.

What is claimed is:

1. In the method of forming a coil by concentrically winding alternate layers of niobium foil and an insulating foil around a $Nb_3Sn$ core and then heating the resultant coil in molten tin to convert the niobium windings to $Nb_3Sn$ windings the improvement which comprises employing as the insulating foil a flat niobium foil having a thickness of at most 60 microns the surfaces of which have been oxidized by heating in oxygen at a temperature between 625° C. and 850° C.

2. The insulated coil manufactured by the method of claim 1.

References Cited
UNITED STATES PATENTS

| | | | |
|---|---|---|---|
| 3,055,088 | 9/1962 | Cox | 29—599 |
| 3,056,889 | 10/1962 | Nyberg | 29—599 |
| 3,239,731 | 3/1966 | Matovich | 317—258 |
| 3,243,871 | 4/1966 | Saur. | |
| 3,258,828 | 7/1966 | Swartz | 29—599 |

RALPH S. KENDALL, *Primary Examiner.*